Nov. 16, 1965 R. L. FENNER 3,218,647

SYSTEM, APPARATUS AND METHOD FOR RECORDING AND SENSING

Filed June 10, 1959 6 Sheets-Sheet 1

INVENTOR.
Ralph L. Fenner

BY Flehr and Swain

Attorneys

SYSTEM, APPARATUS AND METHOD FOR RECORDING AND SENSING

Filed June 10, 1959 6 Sheets-Sheet 2

INVENTOR.
Ralph L. Fenner
BY Flehr & Swain
Attorneys

INVENTOR.
Ralph L. Fenner
BY Flehr & Swain
Attorneys

SYSTEM, APPARATUS AND METHOD FOR RECORDING AND SENSING

Filed June 10, 1959 6 Sheets-Sheet 4

INVENTOR.
Ralph L. Fenner
BY Fleha and Swain
Attorneys

INVENTOR.
Ralph L. Fenner
BY Fleh [signature]
Attorneys

SYSTEM, APPARATUS AND METHOD FOR RECORDING AND SENSING

Filed June 10, 1959

INVENTOR.
Ralph L. Fenner
BY [signature]
Attorneys

United States Patent Office 3,218,647
Patented Nov. 16, 1965

3,218,647

SYSTEM, APPARATUS AND METHOD FOR RECORDING AND SENSING

Ralph L. Fenner, Berkeley, Calif., assignor, by mesne assignments, to Berkeley Instruments, Emeryville, Calif., a partnership Filed June 10, 1959, Ser. No. 819,294
8 Claims. (Cl. 346—74)

This invention relates to a system, apparatus and method for recording and sensing, and more particularly to a system, apparatus and method in which a recording medium that can be perforated is utilized.

Conventional systems for recording and sensing utilizing a recording medium which can be perforated and read have been limited to applications of relatively low speeds, e.g. 60–100 words per minute. At the present time, there is a great need for apparatus which will record information by placing perforations in a recording medium at very high speeds and which can also sense or read the information placed on the recording medium at the same speed or at higher speeds. At the present time there is also a great need for apparatus which will record binary digital information with very low power requirement and which can be read out automatically.

In general, it is an object of the present invention to provide a system, apparatus and method for recording and sensing in which information can be recorded at high speeds and taken off or sensed at high speeds.

Another object of the invention is to provide a system, apparatus and method of the above character in which information is recorded by placing perforations in the recording medium in a novel manner.

Another object of the invention is to provide a system, apparatus and method of the above character in which regulated high voltage pulses are utilized for burning perforations into recording medium.

Another object of the invention is to provide a system, apparatus and method of the above character in which the size of the perforations is controlled by limiting the current flow.

Another object of the invention is to provide a system, apparatus and method of the above character in which the pulses for burning the holes into the recording medium are timed with respect to the speed of movement of the recording medium.

Another object of the invention is to provide a system, apparatus and method of the above character in which the recording medium includes a cellulose material.

Another object of the invention is to provide a system, apparatus and method of the above character in which the perforations are relatively small and may be closely spaced on the recording medium.

Another object of the invention is to provide a system and apparatus of the above character in which a novel type of blocking oscillator is used in the apparatus for perforating and in the apparatus for sensing.

Another object of the invention is to provide a system and apparatus of the above character in which regulated high voltage pulses with limited current flow are produced by the perforating apparatus.

Another object of the invention is to provide a system and apparatus of the above character in which the voltage produced by the perforating apparatus is greater than the dielectric strength of the recording medium.

Another object of the invention is to provide a system and apparatus of the above character in which the voltage produced by the sensing apparatus is less than the dielectric strength of the recording medium.

Another object of the invention is to provide a system and apparatus of the above character in which multiple channel codes can be utilized and in which the multiple channel codes can be used for recording and reading ordinal relations.

Another object of the invention is to provide a system and apparatus of the above character which utilizes a particularly novel binary to decimal matrix.

Another object of the invention is to provide a system and apparatus of the above character in which particularly novel switching mechanisms are utilized.

Additional objects and features of the invention will appear from the following description in which preferred embodiments have been set forth in detail in conjunction with the accompanying drawing.

Referring to the drawing.

FIGURES 3*a*, 3*b*, 3*c*, 3*d* and 3*e* are partially schematic illustrations illustrating the principles utilized in placing perforations in the recording medium.

Figures 3A, 3B, 3C, 3D, 3E, 4, 7:
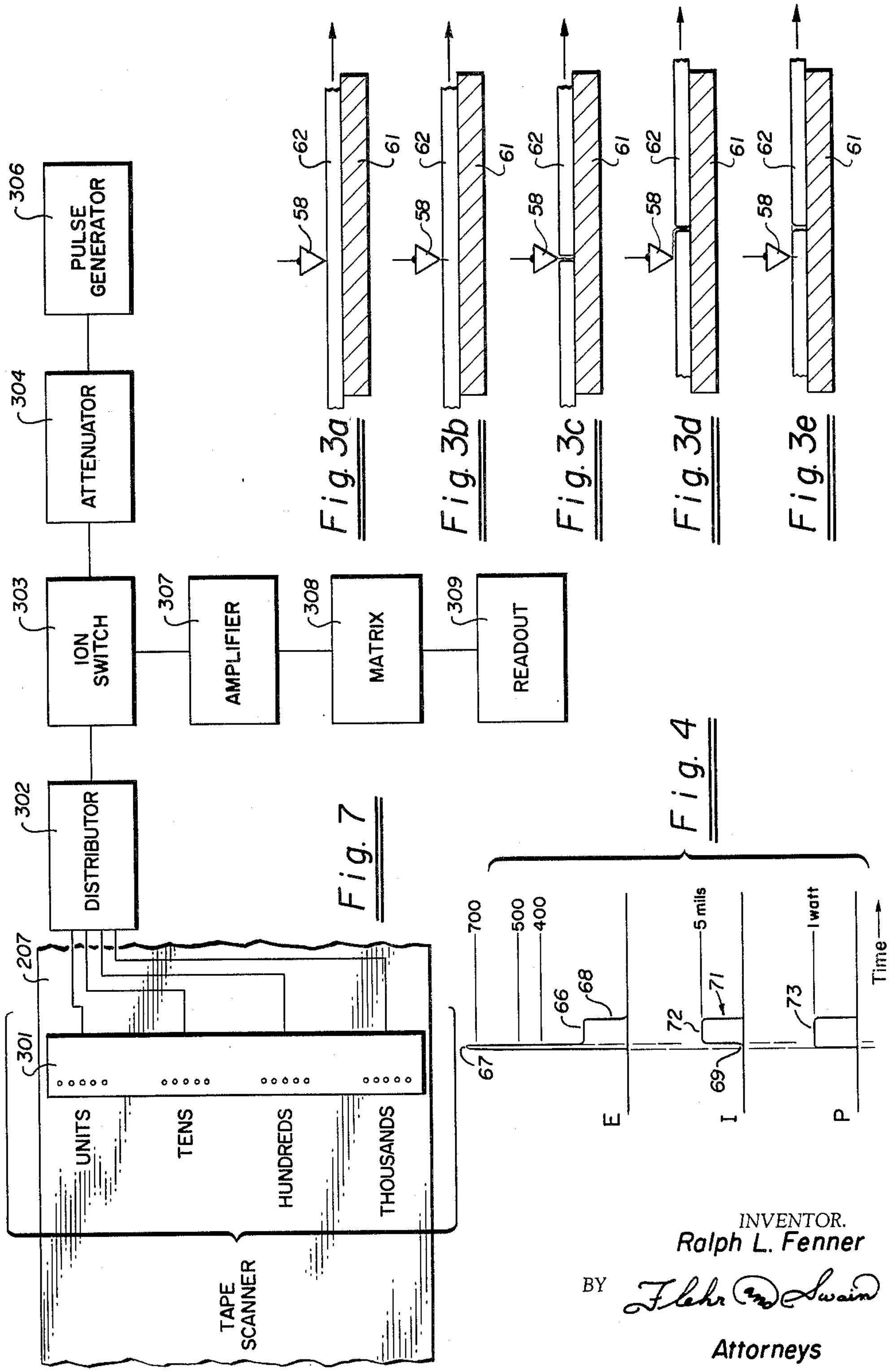
Figures 5, 6:
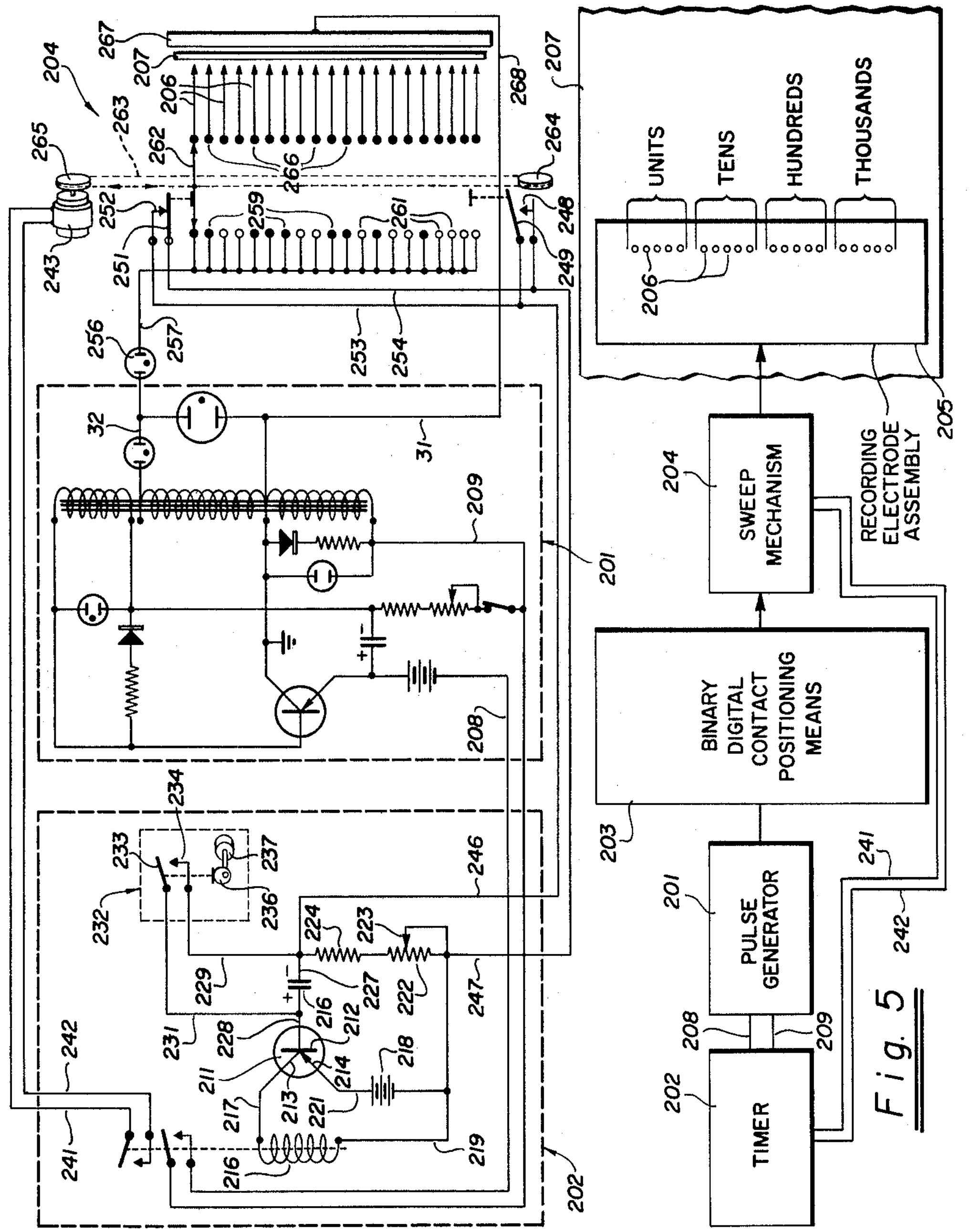
Figure 8A:
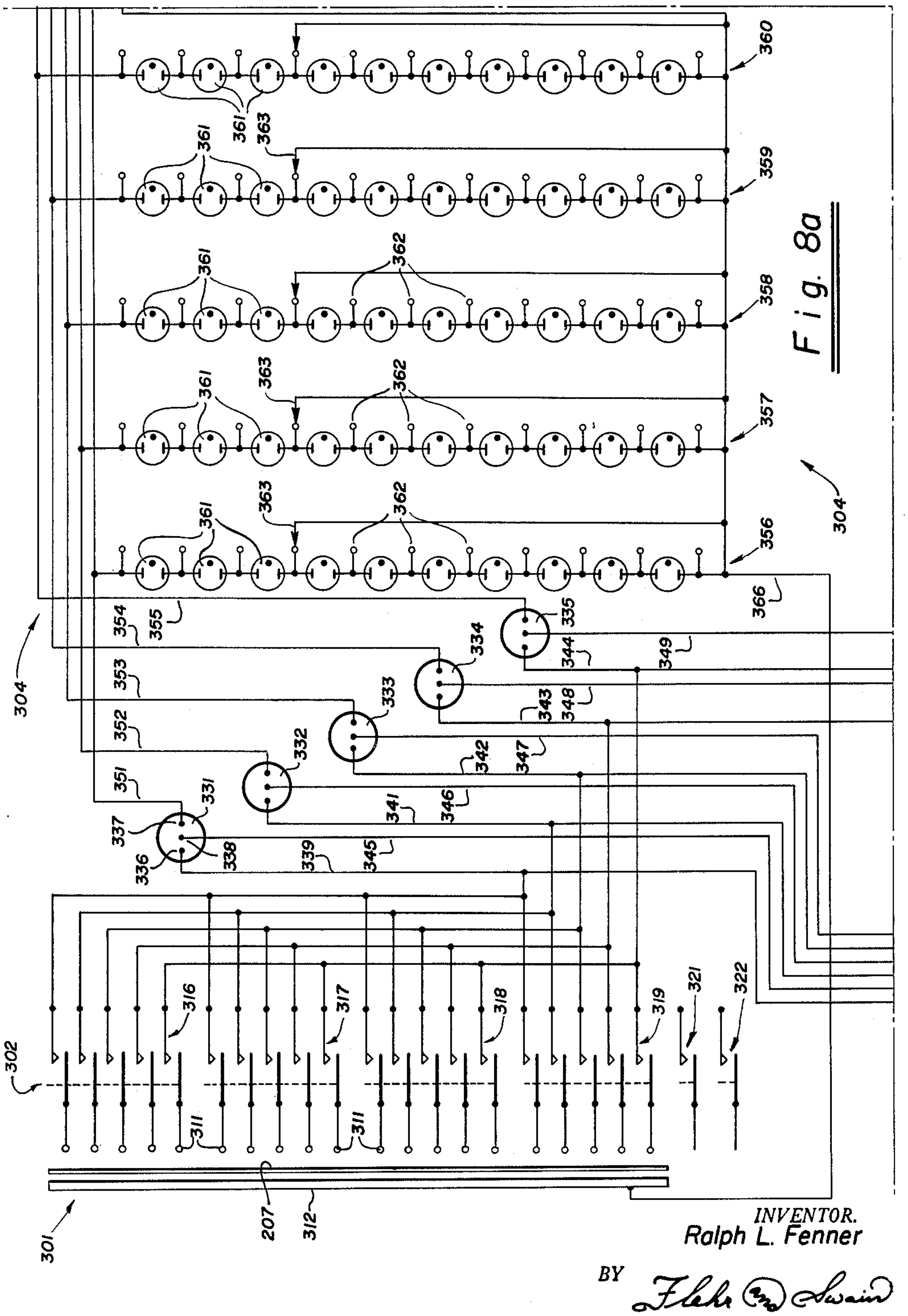
Figure 8B:
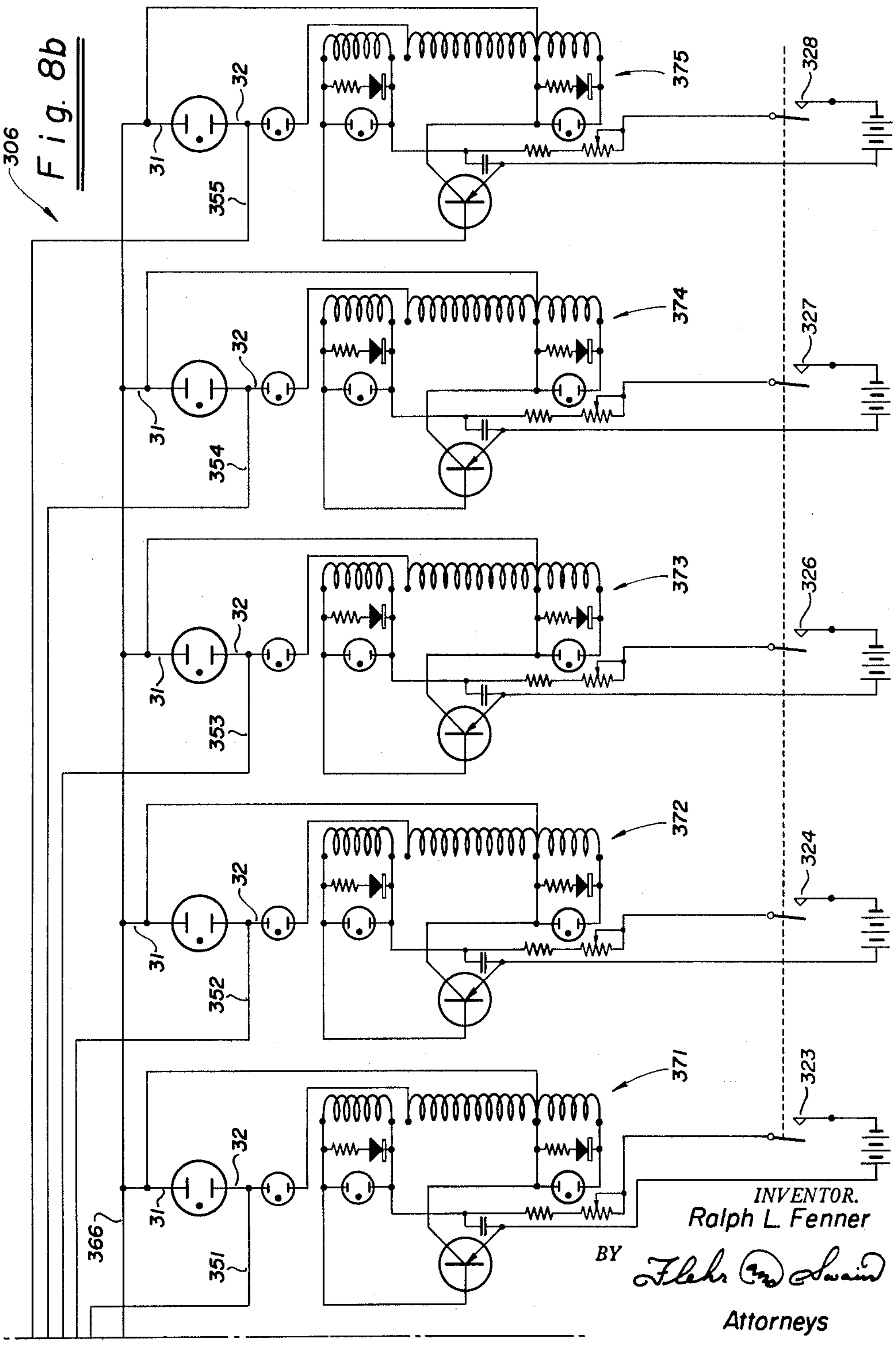
Figure 8C:
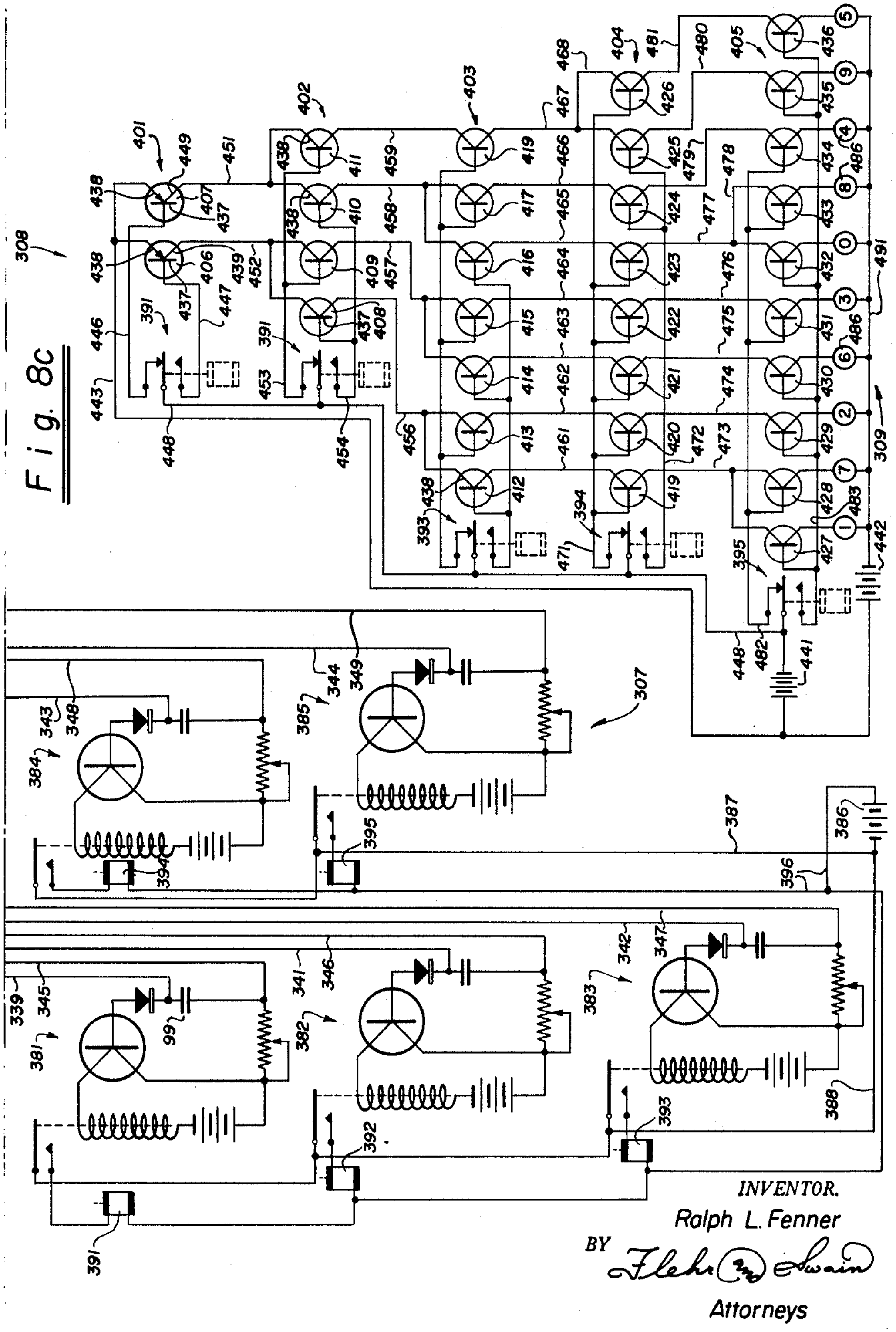

FIGURE 4 is a graph showing the voltages, current and power utilized in burning a perforation into a recording medium;

FIGURE 5 is a block diagram of a perforating apparatus for recording information in multiple channels on the recording medium;

FIGURE 6 is a circuit diagram with certain parts schematically illustrated of the apparatus shown in FIGURE 5;

FIGURE 7 is a block diagram of a sensing apparatus for sensing information recorded in multiple channels on the recording medium;

FIGURES 8*a*, 8*b* and 8*c* are circuit diagrams of the apparatus as shown in block diagram form in FIGURE 7;

In general, the present invention consists of recording information on a sheet recording medium containing cellulose by generating a pulse which has a regulated voltage greater than the dielectric strength of the recording medium and then applying the pulse across the recording medium. The application of the pulse causes a breakdown of the recording medium by carbonizing the cellulose material and incinerating the carbonized portion to produce a perforation or hole in the recording medium. The information recorded on the recording medium is sensed by generating a pulse which has a voltage less than the dielectric strength of the material and applying the pulse across the recording medium to sense a perforation in the recording medium by ionizing the air in the perforation and causing a current flow to give an indication that a perforation has been sensed.

Figures 1, 2:
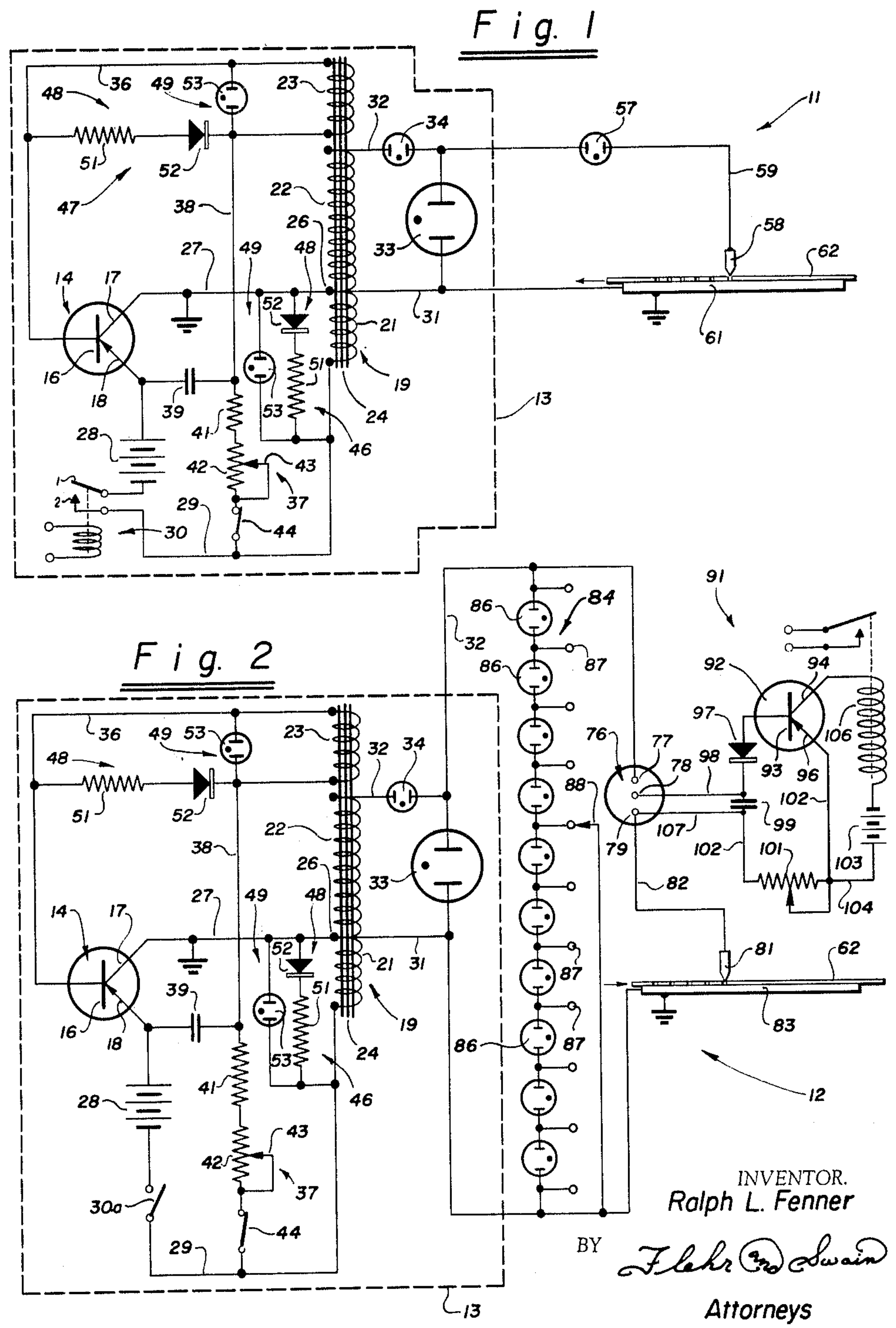
FIGURE 1 is a circuit diagram with certain parts schematically illustrated of a punching or perforating apparatus utilized in my invention.
FIGURE 2 is a circuit diagram with certain parts schematically illustrated showing the sensing or reading apparatus utilized in my invention.

In FIGURES 1 and 2, I have shown a complete system and apparatus which can be utilized in conjunction with performing my method for recording information on a recording medium and sensing the information recorded on the recording medium. FIGURE 1 is a circuit diagram with certain parts schematically illustrated showing recording or perforating apparatus 11 and FIGURE 2 is a circuit diagram with certain parts schematically illustrated showing sensing or reading apparatus 12. The recording or perforating apparatus 11 and the sensing or reading apparatus 12 utilize substantially identical regulated power supplies or pulse generators 13.

*The pulse generator*

Each of the power supplies consists of a transistor 14 which has base, collector and emitter elements 16, 17 and 18, respectively. It also consists of a transformer 19 which has primary, secondary and feedback windings 21, 22 and 23, respectively, wound on a core 24. The primary and secondary windings are interconnected at point 26 to form an autotransformer. The primary winding 21 is connected across the collector and the emitter of the transistor. The side of the primary winding connected to the tap 26 is connected to the collector 17 by conductor 27, and the other side of the winding is connected to the negative terminal of a suitable D.-C. power supply such as a battery 28 by a conductor 29 through relay contacts 1 and 2 of a relay 30. The positive terminal of the battery 28 is connected to the emitter 18. The secondary winding is connected to output leads 31 and 32. A voltage regulator tube 33 is connected in parallel with the secondary winding across the conductors 31 and 32. A current limiting bulb 34 is connected in series with the output lead 32.

The feedback winding 23 is connected between the base 16 of the transistor by a conductor 36 and to an RC timing network 37 by a conductor 38. The timing network consists of a capacitor 39 which has one end connected to the emitter 18 and the other side connected to the conductor 38. It also consists of a fixed resistance 41 which has one end connected to the conductor 38 and the other end connected to a variable resistance 42, which is provided with a movable tap 43. The other end of the variable resistance 42 to which the movable tap is connected, is connected to one side of a switch 44 and the other side of the switch is connected to the conductor 29.

Means 46 is provided in the primary circuit and means 47 is provided in the feedback circuit for bypassing substantially all of any back E.M.F. induced in the primary and feedback windings and also to bypass any radio frequency energy induced in the primary and feedback windings. The means 46 and 47 are substantially identical and each consists of two parallel circuits in parallel with the associated winding, parallel circuit 48 being for the purpose of bypassing substantially all of the back E.M.F. induced into the circuit and parallel circuit 49 being for the purpose of bypassing any radio frequency energy introduced into the circuit. Circuit 48 consists of a resistance 51 connected in series with suitable rectifier means 52 such as a diode 52. The diode 52 is connected in such a manner that current can flow in only one direction in the circuit. Circuit 49 consists of a suitable lamp 53 such as neon blub for bypassing any radio frequency energy induced in the winding.

Operation of the regulated power supply 13 may now be briefly described as follows: Let it be assumed that the power supply is quiescent, that is, there is no current flowing in the primary winding 21. When the power supply is in condition, there is a charge on the capacitor 39 which serves to bias the transistor beyond cutoff. However, the charge on the condenser 39 gradually bleeds off through the resistors 41 and 42. The charge on the condenser 39 continues to bleed off through the resisters 41 and 42 until current begins to flow in the collector-emitter circuit of the transistor (assuming that contacts 1 and 2 of relay 30 are closed). Current flow through the collector-emitter circuit of the transistor causes current to flow through the primary winding 21 of the transformer. Current flow in the primary winding 21 induces current flow in the secondary winding 22 and the feedback winding 23. The voltage produced in the feedback winding causes a current flow in the base circuit of the transistor and also causes rapid charging of the capacitor 39. Current flow in the base-emitter circuit causes an increase in the flow of collector current which in turn causes an increase in flow of current in the primary winding. The increased current flow in the primary winding causes an increased flow in the base-emitter circuit. The result is cumulative, that is, both the base and collector currents reach a peak as the capacitor 39 is charged.

As the voltage across the capacitor 39 reaches its maximum value, the charging current decreases and causes a drop in the base current which in turn results in a reduction in the collector current. This is also cumulative and results in a rather abrupt cutoff of current flow through the primary winding 21.

The rapid drop of current flow in the primary winding 21 causes a reversal of polarity of the voltages induced in the secondary and feedback windings 22 and 23. The base-emitter circuit of the transistor acts as a rectfier and, therefore, the reversal of polarity does not result in a rapid discharge of the capacitor 39. The capacitor 39 must discharge through resistances 41 and 42.

The operation of the power supply is such that there is a sudden pulse of current flow as the capacitor 39 is charging rapidly which is followed by a rather long period of no current flow through the primary windings as the capacitor 39 is discharging. The charging time of the capacitor 39 depends upon the combined impedances of the base-emitter circuit of the transistor and the feedback winding 23. The discharge time is dependent upon the RC time constant of the RC network 37. It is, therefore, apparent that the pulse rate of the power supply is determined by a combination of the charge and discharge times of the capacitor 39. The adjustable tap 43 has been provided to vary the rate of oscillation of the power supply, that is, the time interval between each pulse. The switch 44 has been provided so that when it is opened, infinite resistance is placed in the circuit and, therefore, the discharge time of the capacitor 39 is determined by the leakage rate through the capacitor itself. This would give the minimum rate of oscillation for the chosen value of the capacitor 39. The rate of oscillation could be decreased still further by increasing the size of the capacitor 39.

The rapid build up and collapse of current flow in the primary winding 21 causes a rapid build up and collapse of magnetic fields within the transformer. One strong magnetic field is built up when the current flow in the primary winding increases sharply and a second strong magnetic field is built up when the current flow in the primary winding drops or decreases sharply. This magnetic field build up caused by the sharp decrease in the primary current serves to induce undesirable back E.M.F. into the primary and feedback windings 21 and 23 which if repeatedly impressed across the transistor 14 would cause almost immediate breakdown of the transistor. The back E.M.F. has particularly high value because the secondary winding 22 normally has a very high ratio of turns with respect to the primary and feedback windings. Substantially all of this back E.M.F. is bypassed by the diodes 52 which is effect places a short circuit on the windings for voltages of this polarity. The resistances 51 have been placed in series with the diodes 52 to induce optimum oscillation in the power supply with minimum reverses of voltage build up. The lamps 53 serve to bypass any radio frequency energy which may be induced into each of the circuits.

As hereinbefore described, the transformer 19 is constructed so that the secondary winding 22 has a very high ratio of turns with respect to the primary winding 21 so that a relatively high voltage is produced across the output of the secondary winding and the conductors 31 and 32. The transformer is constructed with a core of audio grade transformer material in order to obtain high permeability and to reduce saturation. The transformer is also constructed in this manner to obtain steep wave fronts so that there is a rapid build up in the voltage induced in the secondary winding 22.

The tube 34 ionizes at a relatively low voltage and serves as a current limiting device to protect the transformer 19 in the event a short occurs between the leads 31 and 32. The tube 33 ionizes at a relatively high voltage and generally at a voltage substantially higher than the working voltage desired from the lines 31 and 32 and, therefore, serves as a voltage regulator to prevent the voltage in the secondary winding 22 from rising to extremely high values.

By way of example, one embodiment of my invention had components with the following characteristics.

| | |
|---|---|
| Transformer 19: | |
| Primary winding 21 | 100 turns. |
| Secondary winding 22 | 5800 turns. |
| Feedback winding 23 | 62 turns. |
| Tube 33 | Type #R–2, fires at approximately 1200 volts. |
| Bulbs 53, 34 and 57 | Type NE2, manufactured by General Eelectric. |
| Capacitor 39 | 1500 microfarads. |
| Resistor 41 | 47 ohms. |
| Resistor 42 | 15,000 ohms. |
| Resistor 51 | 47 ohms. |
| Diodes 52 | Sarkes Tarzian Type #M–150. |
| Transistor 22 | Sylvania 2N307A, CBS 2N256, or Bendix 2N243. |
| Battery 28 | 6 volts. |

It was found that such a unit operated very satisfactorily and had a pulse rate of approximately 1 pulse each 20 seconds to 100 pulses per second. With a small six volt dry well battery, such as pulse generator would operate from the battery for a period of approximately six months at a rate of 1 pulse per second. It is readily apparent that by reducing the size of the capacitor 39 and the size of the resistors 41 and 42 that the pulse rate of the pulse generator can be increased greatly. For example, no difficulty was experienced in operating the pulse generator at 500 pulses per second with C39 at 4 microfarads and R41 at 30 ohms.

*The recording apparatus*

The recording and perforating apparatus 11 consists of the power supply or pulse generator 13 hereinbefore described which has its output lead 32 connected to one side of a current limiting device 57. The other side of the current limiting device is connected to an electrode or contact 58 by conductor 59. Output lead 31 of the pulse generator 13 is grounded to a conducting platen 61 which is grounded. The recording medium 62 which contains cellulose is advanced over the platen 61 by means (not shown) in the direction indicated. The operation of the recording and perforating apparatus is such that each time the switch 30 is closed by suitable means, current flows through the transistor 14 in the pulse generator. Each time current flows in the transistor, two pulses are applied to the electrode 58, one when the current builds up in the primary winding 21 and one when the current drops off in the primary winding 21. As can be seen in FIGURE 1, the pulses are applied across the recording medium 62. Each of the pulses has a voltage which is greater than the dielectric strength of the recording medium and, therefore, serves to establish an ionized path for flow of current through the recording medium by carbonizing the cellulose material in the medium. The carbonized material is then incinerated to provide the perforation in the recording medium as hereinafter explained, the current flow during incinceration being limited by current limiting devices 34 and 57. One of the current limiting devices only is required however. The current limiting device 34 is normally an integral part of the pulse generator 13 whereas the current limiting device 57 is not an integral part of the power supply.

The principles utilized in perforating the recording medium can best be explained by reference to FIGURES 3*a* to 3*e* and FIGURE 4. Let it be assumed that the recording medium 62 is a strip of paper which is advanced under the electrode as shown in FIGURES 3*a* and 3*e*. As is well known to those skilled in the art, paper is comprised of cellulose which has a relatively high dielectric strength. When it is raised to a certain predetermined temperature, a chemical reaction is initiated which results in carbonization or charring. When the cellulose material is carbonized, it provides a carbon path which has an extremely low resistance and, therefore, is a good conductor of electricity. The carbonized material can be incinerated or burned to remove it from the recording medium to provide an opening or perforation. As soon as the carbonized material has been removed, a space is provided which has a dielectric strength substantially greater than that of the carbonized material but less than that of the paper. In general, the dielectric strength of air in comparing it with an equivalent thickness of paper, it is approximately one-half of that of paper.

With these principles in mind, the diagram in FIGURES 3*a* to 3*e* can be examined. Diagram 3*a* shows the platen 61 and the electrode 58 separated by the recording medium 62 which contains cellulose. As explained previously, such a recording medium could consist of a paper strip. The voltage from the power supply 13 must be greater than the dielectric strength of the paper 62 and, therefore, the ionization voltage of the tube 33 should be substantially greater than the breakdown voltage for the paper.

Now let it be assumed that a high voltage pulse is produced by the power supply 13 which is sufficient to overcome the dielectric strength of the paper 62. As shown by the curve 66 in FIGURE 4, the voltage E is very high as shown at 67 at the moment before an ionization path is established between the electrode 58 and the platen 61 or before breakdown of the paper occurs and that upon breakdown or ionization, the voltage drops sharply to a substantially lower level as is shown by step 58 in the voltage curve 66. The establishment of the ionization path through the paper causes carbonization of the cellulose material interposed between the two electrodes which are shown as the electrode 58 and the platen 61. This initial ionization occurs with a very small current as shown by the portion 69 of the current curve 71. However, as soon as carbonization has taken place, the resistance to current flow is substantially reduced and the current flow increases sharply to the point 72 in the current curve 71. This occurs at approximately the same time as there is a substantial drop in the voltage. During the period of time in which this relatively high value of current is flowing through the carbonized material, the carbonized material is being incinerated or destroyed. Some of the energy for this destruction is of course supplied by the pulse generator 13 as shown by the power curve 73 in FIGURE 4 which is the product of the voltage and current curves 66 and 71. However, most of the energy for causing incineration or destruction of the carbonized material comes from the energy which is released by incineration of the carbonized material.

The breakdown of the dielectric 52 is shown in FIGURE 3*b* whereas the destruction or incineration of the carbonized material is shown in FIGURE 3*c*. The breakdown of the dielectric and the subsequent incineration or destruction of the carbonized cellulose material occurs within a very short interval of time as for example, 1 millisecond. During this short period of time, there is no appreciable movement of the recording medium 62 relative to the electrode 58. However, after the pulse has been applied to the electrode 58 and normally before the next pulse is applied to the electrode 58, the recording medium 62 will be moved an appreciable distance. If the recording medium has not been moved far enough by the time the next pulse is applied, an ionization path will be established from the electrode and through the hole or perforation which was previously punched. This is due to the fact that the dielectric strength of the air in the space from which the carbonized material has been removed is substantially less than the dielectric strength of the recording medium. The pulse takes the path of least resistance which is through the last made perforation. This is shown in FIGURE 3*d*. It is, therefore, important that the timing between the pulses from the power supply 13 and the movement of the recording medium be such that the recording medium has been moved a distance equal to at least twice the thickness of the paper so that the next pulse will make another perforation rather than going through a previous opening. A movement of more than twice the thickness of the paper is required because air normally has the dielectric strength which is normally approximately one-half that of paper. After the recording medium has been moved a sufficient distance, the next pulse will place another perforation in the paper in the same manner as hereinbefore described.

In one embodiment of my invention, it was found that paper having a thickness of 1½ to 2 mils operated very satisfactorily. It is generally preferable although not necessary to utilize paper which contains substantially 100 percent cellulose because it has been found that such paper is more uniform and for that reason the voltage required for breaking it down is relatively constant. With such paper of 1½ to 2 mils in thickness, the breakdown of voltage is approximately 700 volts and carbonization occurs between 400° and 500° F. Incineration of the carbonized material takes place at substantially below 400 volts. The dielectric strength of the air in the perforation formed upon incineration of the carbonized material is approximately 500 volts.

Although paper having a thickness of from 1½ to 2 mils was found to be particularly satisfactory, paper from 1 mil in thickness up to 10 mils can be utilized if desired. The greater thicknesses of paper can be utilized merely by raising the voltage output from the power supply. The paper which has proven most effective in this application is a paper made from flax. This paper, used in cigarette making and Bible printing is electrically flat, free of pinholes, white and has even combustion characteristics. One paper found to be quite satisfactory is manufactured by Olin Mathieson Paper Company, and is designated at 24# Flax-opaque, and had a thickness of .0019.

The incineration is terminated when all the carbonized material has been burned. Air takes the place of the carbonized material which has been incinerated. The air has a much higher dielectric strength than the carbonized material and hence snuffs out or abruptly cuts off the current flow. This sharp decrease in current flow causes an increase in the voltage. However, the power generated by travel of the pulse through the ionization path in the air is insufficient to sustain combustion and for that reason, the size of the hole perforated in the paper is limited. Because of the fact that insufficient power is generated to sustain combustion by ionization of the air, the size of the hole is not increased substantially even though pulses are repeatedly applied through the same hole.

It has been found that the holes or perforations made in this manner have a diameter of approximately one thousandth (.001) of an inch. With paper of 1½ to 2 mils thickness, it has been found that 50 holes can be readily punched in a linear inch without any danger of flashover into a preceding hole.

As has been pointed out above, because the pulses will return through a preceding hole in the paper until such time as the dielectric strength of the paper is less than the dielectric strength of the air path back through the preceding hole, it is impossible to shear paper with perforations from the apparatus 11. The paper must be moved a sufficient distance before the pulse will cause a breakdown of the paper rather than follow an air path.

*The sensing or reading apparatus*

The sensing or reading apparatus 12 utilizes a voltage which is susbtantially less than the dielectric strength of the recording medium but which is greater than the dielectric strength of the air space in each of the perforations in the recording medium. Thus, the voltage utilized is insufficient to actually cause a breakdown of the recording medium but is sufficient to ionize the air in the perforations in the recording medium.

The power supply 13 in the sensing or reading apparatus 12 is substantially identical to the power supply used in the recording apparatus except that it is provided with an on-off switch 30*a* in place of the relay 30. Output terminal 32 of the power supply is connected to one of the terminals of an ion switch 76. The ion switch 76 can be of any suitable type such as a gas-filled cold cathode tube which has three elements 77, 78, and 79. Element 77 is connected to the conductor 32. Element 79 is connected to an electrode 81 by a conductor 82. The output line 31 from the power supply 13 is connected to the ground by platen 83 over which the recording medium 62 is moved. The recording medium is moved over the platen and with respect to the electrode 81 by suitable means (not shown) in the direction indicated.

Attenuator means 84 is connected across the output lines 31 and 32 and is comprised of a plurality of serially connected ionizing devices 86 each of which ionizes at a predetermined voltage. Such devices can consist of gas-filled cold cathode two element tubes. Taps 87 have been provided between each of the tubes 86 which are adapted to be engaged by a movable contact 88 so that any number of the tubes 86 can be connected in series across the conductors 31 and 32 varying from zero to the maximum number. For example, in the embodiment shown in FIGURE 2, ten tubes have been utilized. It is readily apparent that any number of tubes from zero to ten can be inserted in series across the conductors 31 and 32 to thereby adjust the output voltage from the attenuator means which is applied across the elements 77 and 79 of the ion switch 76. With each of the tubes 86 ionizing at approximately 60 volts, it is readily apparent that a voltage range from 0 to 600 volts in 60 volt steps can be provided by the attenuator 84.

The ion switch 76 is connected to an amplifier 91 which consists of a transistor 92 having base, collector and emitter elements 93, 94 and 96. The base 93 of the transistor is connected to one side of a diode 97 and the other side of the diode is connected to the element 78 of the ion switch 76 by a conductor 98. Conductor 98 is also connected to one side of a capacitor 99 and the other side of the capacitor 99 is connected to one side of a variable resistance 101 by conductor 102. The other side of the resistance 101 is connected to the emitter 96 by conductor 102. Conductor 102 is connected to the positive terminal of a battery 103 by conductor 104 and the negative side of the battery is connected to one side of the winding of a relay 106 and the other side of the winding is connected to a collector 94 of the transistor. The relay is provided with movable contact 1 and stationary contact 2 which are normally open and adapted to be moved towards closed positions by energization of the relay. Conductor 102 is also connected to element 79 of the ion switch 76 by conductor 107.

Operation of the sensing or reading apparatus 12 may now be briefly described as follows: Let it be assumed that the recording medium is of the type hereinbefore described, that is, that the recording medium is a paper strip or tape which has a dielectric strength of approximately 700 volts and in which the air space in the perforation 66 requires an ionization potential of between 400 and 500 volts. Also let it be assumed that the attenuator means 84 has been adjusted so that the output voltage from the attenuator means 84 is greater than that required for ionization of the air space in the perforations and substantially less than the dielectric strength of the paper. The operation of the pulse generator 13 is substantially identical to the operation hereinbefore described in conjunction with the recording or perforating apparatus. The time delay network 37, however, is adjusted so that the pulse rate of the pulse generator 13 is substantially greater than the greatest possible number of perforations which must be sensed within a period of time. If the tape is advanced periodically, then the tape must be stopped each time a perforation is to be sensed for a period of time which will allow the generation of at least one and preferably several pulses by the pulse generator 13. If the tape is travelling continuously, each perforation to be sensed must be under the electrode 81 for a period of time to also permit the generation of at least one pulse and preferably several pulses. This normally poses no problem because the pulse generator can be set to operate at very high rates of speed as hereinbefore described.

Upon the generation of a pulse by the pulse generator 13, during the time the electrode 81 is over one of the perforations 66, the high voltage pulse will cause ionization or breakdown of the air space within the perforation 66 immediately underlying the electrode 81. At the same time that this occurs, the ion tube or switch 76 is ionized. Upon operation of the apparatus, it was first thought that the ionization of the ion switch 76 established a short circuit across the condenser 99 which serves to discharge the condenser 99. However, it is now believed that the ionization of the air space within the perforation 66 creates a spark which contains radio frequencies. These radio frequencies are rectified by the diode 97 and serve to build up a D.C. voltage on the condenser 99 which discharges the condenser 99. This occurs because the voltage built up is exactly the opposite to that built up by the battery 103 as hereinafter described.

Discharge of the condenser 99 causes operation of the amplifier 91 and the associated relay 106. Current flows in the base circuit of the transistor because the condenser 99 is being charged by the battery 103 through the resistance 101. Current flow in the base circuit causes current flow in the collector-emitter circuit of the transistor and through the winding of the relay 106. Current flow through the winding closes contacts 1 and 2 which can be utilized for operating any desired apparatus such as a readout device. Current continues to flow in the base circuit of the transistor and the relay 106 is maintained in an operated condition until the capacitor 99 is charged. The value of the resistance 101 and the size of the capacitor 99 determine the rate of charging of the capacitor 99.

Normally, the time required for the charging of the capacitor 99 is such that the relay 106 will remain closed until the next pulse is generated by the pulse generator 13. In this way, chattering of the relay 106 is prevented. For example, if the electrode 81 is over a perforation 66 for a period of time which allows the generation of more than one pulse by the pulse generator 13, only one closing of the contacts 1 and 2 of the relay 106 will occur.

The perforations in the recording medium or tape 62 are normally spaced so that the time interval for movement of the recording medium from one perforation to another is sufficient to permit the generation of at least one pulse by the pulse generator 13. When such is the case, the pulse produced between the perforations will be discharged across the attenuator means before the voltage can rise to a value which would be sufficient to cause a breakdown of the paper tape 62. Since no ionization path is established through the ion switch 76 and also because no spark is created during this time, the capacitor 99 will not be discharged and hence will become fully charged. When the capacitor is fully charged, all the current flow through the base circuit of the transistor and, therefore, through the collector-emitter circuit and the relay 106 will cease to permit contacts 1 and 2 of the relay 106 to open. When another perforation 66 is brought under the electrode 81, the air space within the perforation will be ionized, and the same sequence of operations will occur.

The diode 97 in addition to rectifying the radio frequency energy from the spark cap also serves to prevent any back E.M.F. generated in the amplifier circuit from destroying the transistor 92.

The foregoing description in conjunction with FIGURES 1 and 2, discloses a system, apparatus and method for recording and sensing in which information is recorded in a single channel and sensed in a single channel. It is, however, apparent that there are many applications in which information must be recorded in multiple channels and sensed in multiple channels. For that reason, I have disclosed in FIGURES 5 to 8 as a part of my invention and as hereinafter described, a system, apparatus and method for multiple channel recording and sensing.

*Multiple channel recording apparatus*

In FIGURE 5 I have shown a block diagram of a multiple channel recording apparatus which can be utilized in conjunction with performing my method for recording information on a recording medium. The multiple channel recording apparatus consists of a pulse generator 201 which is controlled by timer 202. The pulse generator is connected to binary to digital contact positioning means 203. The positioning means 203 is connected to a sweep 204 and the sweep is connected to the recording electrode assembly 205. The recording electrode assembly consists of a plurality of electrodes 206 which have been grouped as shown to record information in units, tens, hundreds, and thousands on a suitable recording medium such as a paper tape 207.

The pulse generator 201 as shown in FIGURE 6 is substantially identical to the pulse generator 13 shown in FIGURE 1, with the exception that the negative terminal of the battery 28 is connected to a conductor 208 and conductor 29 is connected to a conductor 209 rather than being connected to contacts 1 and 2 of the relay 30. The pulse rate of the pulse generator 201 is determined by the timing means 202.

The timing means 202 consists of a transistor 211 which is provided with base, collector and emitter elements 212, 213 and 214 respectively. The collector is connected to one side of the winding of a relay 216 by a conductor 217 and the other side of the winding is connected to the negative terminal of a suitable D.C. power supply such as a battery 218 by a conductor 219. The positive terminal of the battery is connected to the emitter 214 by a conductor 221. Conductor 219 is also connected to one side of a potentiometer or variable resistance 222 which is provided with an adjustable tap 223. The other side of the potentiometer and the tap 223 are connected to one side of a fixed resistance 224 and the other side of the fixed resistance is connected to a capacitor 226 by conductor 227. The other side of the capacitor is connected to the base 212 of the transistor by conductor 228. Conductors 227 and 228 are connected to conductors 229 and 231 which are connected to means 232 which serves at periodic intervals to momentarily connect the conductors 229 and 231. As shown, such means can consist of a pair of contacts 233 and 234 which are adapted to be closed at periodic intervals by a cam 236 driven by a motor 237.

Relay 216 includes two sets of normally open contacts 1 and 2 and 3 and 4. Contacts 1 and 2 are connected by conductors 241 and 242 to a motor 243 which is a part of the sweep mechanism 204. Contacts 3 and 4 are connected across the conductors 208 and 209 of the pulse generator 201. Conductors 227 and 219 are also connected to conductors 246 and 247. Conductors 246 and 247 are connected to normally open contacts 248 and 249 in the sweep mechanism 204 for a purpose hereinafter described. Contacts 248 and 249 are connected in parallel with contacts 251 and 252 by conductors 253 and 254.

The output conductor 32 of the pulse generator 201 is connected to one side of a suitable current limiting device such as a neon bulb 256. The other side of the current limiting device is connected to the binary digital contact positioning means 203 by conductor 257. The binary to digital contact positioning means 203 has been shown in schematic form because such binary to digital contact positioning means is well known to those skilled in the art. Such means can consist of a drum which is provided with conducting points or contacts 259 and insulating points or contacts 261 which are located in a predetermined pattern on the drum in a binary arrangement. Such a drum could then be utilized to give shaft position information. The shaft for driving the drum could, for example, be connected to a float to give liquid level information. Such a drum could also be used for counting if the shaft driving the drum were stepped by suitable means such as a solenoid actuated device. At the end of a predetermined period or after a predetermined number of counts, the drum could be returned to its initial position after which another counting operation could be performed. Such drums can also rotate in either direction to give either a positive or negative information if such information is desired.

As shown, the insulating points and the conducting points have been arranged in four series of five contacts each, the first series being for units, the second series being for tens, the third series for hundreds and the fourth series for thousands.

The conducting points 259 are adapted to be engaged by one side of a sweep 262 of the sweep mechanism 204. The sweep 262 is driven by suitable means such as an endless element 263 received over pulleys 264 and 265. Pulley 265 is driven by the motor 243. The other side of the sweep 262 is adapted to engage contacts 266 which are connected to the electrodes 206 of the electrode assembly 205. The number of contacts 266 is equal to the number of rows of insulating and contact points. The electrodes 206 are positioned on one side of the paper tape 207. A platen 267 is positioned on the other side of the paper tape 207 and is connected to the conductor 31 of the pulse generator 201 by a conductor 268.

Operation of the multiple channel recording apparatus may now be briefly described as follows: Let it be assumed that the motor 237 has been operated to position the cam 236 so that the contacts 233 and 234 are momentarily closed. The momentary closing of the contacts 233 and 234 places a short circuit across the capacitor 226 and, therefore, causes the capacitor 226 to be discharged. The momentary closing of the contacts 233 and 234 may be very short, as for example, 50 to 100 milliseconds in duration. As soon as the capacitor 226 is discharged, current will flow in the emitter-base circuit of the transistor to start charging of the capacitor 226. The rate of current flow is determined by the resistor 224 and the potentiometer 223. The rate of flow is adjusted so that the capacitor will not be fully charged during a predetermined interval of time as hereinafter explained. During the time that current is flowing in the emitter-base circuit an increased current is flowing in the collector-emitter circuit and through the relay coil 216. Flow of current through the coil 216 causes immediate closing of the contacts 1 and 2 and 3 and 4 of the relay. These contacts will remain closed during the time that the capacitor 226 is being charged.

Closing of contacts 1 and 2 initiates operation of the motor 243 which causes the sweep 262 to be moved across the contacts presented to it by the positioning means 203. At the same time, contacts 3 and 4 of the relay 216 are closed to cause operation of pulse generator 201. The pulse generator operates in a manner identical to that hereinbefore described to produce a plurality of high voltage pulses. The pulse rate of the generator is set so that at least two or three pulses are produced by the pulse generator during the time the wiper 262 is over each of the contacts 259 and 261. Since the contact point first engaged by the wiper 262 is a conducting contact 259, a circuit will be completed through the sweep 262 to the electrode 206 and a perforation will be burned into the paper tape 207. A perforation will also be punched when the sweep 262 is advanced to the next row. However, when the motor 243 has advanced the sweep 262 to the third row or position, an insulating portion or contact 261 is engaged which prevents completion of a circuit to the associated electrode and therefore no hole is burned into the tape 207 at this point. The operation continues in this manner until the sweep 262 is advanced past all of the contact points 259 and 261, a perforation being placed in the paper tape 207 at every point that the sweep 262 engages a conducting contact 259.

When the sweep 262 reaches the extreme end of its travel, it closes contacts 248 and 249 which shunts out the resistors 222 and 224 to cause the capacitor 226 to be charged very rapidly. As soon as the capacitor 226 is charged, current flow in the emitter-base circuit ceases as does current flow in the collector-emitter circuit. Cessation of current flow in the collector-emitter circuit causes deenergization of the relay 216 and opening of its contacts 1 and 2 and 3 and 4. The motor driven sweep 262 is stopped as is the operation of the pulse generator 201. From this operation it is seen that a pattern of perforations will be placed in the paper 207 which corresponds exactly to the binary contacts which have been presented to the sweep 262 by the positioning means 203.

It is apparent that the rate of charging of the capacitor 226 must be adjusted by use of the tap 223 so that the capacitor 226 will not become fully charged during the time required for the sweep 262 to travel from one end of the contacts to the other.

After the perforations have been recorded in the paper tape 207 by the travel of the sweep 262 in one direction, means (not shown) advances the paper tape. Thereafter, the momentary contacts 233 and 234 are momentarily closed to reverse motor 243 and to initiate another reading of the positioning means 203. During this operation, the sweep 262 returns along the same path and causes perforations to be formed in the paper tape 207 corresponding to the pattern of the conducting contacts 259. When it reaches the end of the rows of contacts 259 and 261, contacts 251 and 252 are closed to cause complete charging of the capacitor 226 which as hereinbefore described stops the operation of the motor 243 and the pulse generator 201.

A five channel telemetering code well known to those skilled in the art has been shown as being utilized for the positioning of the contacts 259 and 261. As is also well known to those skilled in the art, each of the codes can be utilized for representing a particular number or letter. As shown in the drawing, four separate five channel codes have been utilized to make possible recording in four places or in an ordinal relation. Thus, if the decimal system is used, it is apparent that any number from 0 to 9,999 may be recorded on the paper tape 207. It is also apparent that any combination of four letters and numbers can be recorded during each recording operation, that is, each time the sweep 262 travels from one end to the other.

*Multiple channel reading or sensing apparatus*

A multiple reading or sensing apparatus is shown in block diagram form in FIGURE 7 and consists of a sensing or reading electrode assembly 301 which is adapted to read or sense perforations which have been placed in the paper tape 207. The electrode assembly 301 is connected to a distributor 302 which is connected to an ion switch assembly 303. The ion switch assembly 303 is connected to an attenuator assembly 304 and the attenuator 304 is connected to a pulse generator assembly 306. The ion switch assembly 303 is also connected to an amplifier assembly 307 which is connected to a matrix 308. The matrix 308 is connected to a readout device 309.

A circuit diagram of the multiple channel reading or sensing apparatus shown in FIGURES 8*a*, 8*b*, and 8*c*, as shown particularly in FIGURE 8*a*, the reading electrode assembly 301 consists of a plurality of electrodes 311 which are normally positioned in line on one side of the recording medium 207. A platen 312 is positioned on the side of the recording medium opposite the electrodes 311. The reading electrodes 311 are arranged in series in the same manner as the recording electrodes 206 such that the first series of five electrodes represents the five channel code for units, the second series of five electrodes, the five channel code for tens, the third series of five electrodes, the five channel code for the hundreds and the fourth series of five electrodes, the five channel code for thousands.

The distributor 302 is provided with four series or banks of contacts 316, 317, 318 and 319, which are connected to the corresponding series of the electrodes 311. (E.g. series 316 corresponds to the units series, series 317 corresponds to the tens series.) Each series consists of ten contacts numbered 1 through 10 which form five normally open pairs of contacts. The electrodes 311 are connected to the movable or even numbered contacts of the pairs of contacts. The distributor also includes two pairs of normally open contacts 321 and 322. It also is provided with pairs of contacts 332, 324, 326, 337 and 328 for controlling the pulse generator 306 as hereinafter described. Means (not shown) well known is provided for operating all of the contacts in the distributor in such a manner that contacts 1 to 10 of the first series or bank 316 are closed simultaneously. Sequentially, thereafter, contacts 1 to 10 of the series or banks 317, 318 and 319 are closed and the preceding bank or series of contacts is opened. Each time a bank or series of contacts of the series 316, 317, 318 and 319 are closed, all of the contacts 323, 324, 326, 327 and 328 are closed. After the distributor has progressed through all of the series or banks 316–319, the contacts 321 and 322 are sequentially closed after which the same sequence of operation is repeated, beginning with the closing of the contacts of bank 316.

The ion switch assembly 303 consists of five ion switch tubes 331–335. Each of the ion tubes is comprised of three elements 336, 337 and 338. Element 336 of ion switch 331 is connected to the number 1 contact of each of the series of contacts 316–319 by conductor 339. Element 336 of ion switch 332 is connected to the number 3 contacts of the series of contacts 316–319 by conductor 341. Thus, in the same manner, the elements 336 of the ion switches 333, 334 and 335 are connected to contact numbers 5, 7 and 9 of each of the series of contacts by conductors 342, 343 and 344 respectively. The elements 337 of each of the ion switches 331–335 are connected to conductors 345 to 349 respectively. The elements 338 of the ion switches are connected to conductors 351 to 355 respectively.

The conductors 351 to 355 are connected to the attenuator assembly 304 which consists of five separate attenuator circuits 356, 357, 358, 359 and 360 which are connected to the conductors 351 to 355 respectively. Each of the attenuator circuits is comprised of a plurality of serially connected two element cold cathode gas-filled bulbs 361. Traps 362 are provided between the bulbs 361 and are adapted to be engaged by movable contact 363 to provide varying voltages as hereinbefore described. The attenuator circuits 356–360 are connected to a common conductor 366 which is connected to the platen 312 and ground.

The conductors 351–355 and 366 are connected to the pulse generator assembly 306 as shown in FIGURE 8*b* which consists of five separate pulse generators 371, 372, 373, 374, and 375. The pulse generators are similar to those hereinbefore described and hence will not be described in detail. The output line 31 of each of the pulse generators is connected to the ground line 366. The output line 32 of each of the pulse generators 371 to 375 are connected to the conductors 351 to 355 respectively. The pairs of contacts 323, 324, 326, 237 and 328 are connected in the collector-emitter circuit and take the place of contacts 1 and 2 shown in FIGURE 1.

The conductors 339, 345, 341, 346, 342, 347, 343, 348, 344 and 349 are connected to the amplifier assembly 307. The amplifier assembly 307 is comprised of five amplifiers 381–385 which are substantially identical to the amplifier assembly 91 described in conjunction with FIGURE 2. For this reason, the amplifiers will not be described in detail. The conductors 339 and 345, from the ion switch 331, are connected across the capacitor 99 in the same way that conductors 98 and 107 are connected across the ion switch 76 in FIGURE 2. Movable contact 1 of the relay 106 of each of the amplifiers 381–385 is connected to the negative terminal of a battery 386 by conductors 387 and 388.

Movable contact 2 of each of the pairs of contacts of the amplifiers 381–385 is connected to one side of the windings of relays 391, 392, 393, 394, and 395. The other ends of the windings are connected to the positive terminal of the battery 386 by a conductor 396. Each of the relays is provided with three contacts 1, 2 and 3. Contacts 1 and 2 are normally closed and contacts 2 and 3 are normally open. The relays 391–395 and their associated contacts form a part of the matrix 308.

The matrix 308 consists of five rows 401–405 of transistors which are associated with the amplifiers 381–385 and the relays 391–395. Row 401 of transistors consists of two transistors 406 and 407. Row 402 consists of four transistors 408 to 411. Row 403 consists of seven transistors 412–418. Row 404 consists of eight transistors 419–426 and row 405 consists of ten transistors 427–436. Each of the transistors is comprised of base, emitter and collector elements 437, 438 and 439 respectively.

The emitter elements 438 of the transistors 406 and 407 are connected to the positive terminals of batteries 441 and 442 by a conductor 443. The base 437 of transistor 407 is connected to contact 1 of relay 391 by a conductor 446 and the base 437 of transistor 406 is connected to contact 3 of relay 391 by conductor 447. Movable contact 2 of each of the relays 391 to 395 is connected to the negative terminal of the battery 441 by conductor 448. The collector 449 of the transistor 407 is connected to the emitter elements 438 of the transistors 410 and 411 by conductor 451. Similarly the collector elements 439 of transistor 406 is connected to the emitter elements of the transistors 408 and 409 by a conductor 452.

The base elements of transistors 409 and 411 are connected to the movable contact 1 of relay 392 by the conductor 453 and similarly the base elements 437 of transistors 408 and 410 are connected to stationary contact 3 of relay 392 by conductor 454. The collector element 439 of transistor 408 is connected to the emitter elements 438 of the transistors 412 and 413 by conductor 456. Similarly the collector elements of transistors 409 and 410 are connected to the emitter elements of the transistors 414, 415, 416 and 417 by conductors 457 and 458 respectively. Collector element of the transistor 411 is connected to the emitter element of the transistor element 418 by conductor 459. The base element 437 of the transistors 413, 415, 417 and 418 are connected to the stationary contact 1 of relay 393 and the base elements of transistors 412, 414 and 416 are connected to the stationary contact 3 of the same relay. The collector elements 439 of the transistors 412–418 are connected to the emitter elements of the transistors 419–425 by conductors 461–467. The collector element of the transistor 418 is also connected to the emitter element of the transistor 426 through a conductor 468. The base elements of transistor 419–423 and 426 are connected to the stationary contact 1 of relay 394 by a conductor 471. The base elements of transistors 424 and 425 are connected to movable contacts 3 of relay 394 by conductor 472. The collector element 439 of transistor 419 is connected to the emitter elements of the transistors 427 and 428 by conductor 473. The collector elements of transistors 420 to 423 are connected to the inner elements of transistors 429–432 by conductors 474–477. The collector element of the transistor 423 is also connected to the emitter element of the transistor 433 through a conductor 478. The collector elements of the transistors 424–426 are connected to the emitter elements of the transistors 434–436 by conductors 479–481 respectively. The base elements 437 of the transistors 428, 431, 433 and 434 are connected to stationary contact 1 of relay 395 by conductor 482. The base elements of transistors 427, 429, 430, 432, 435 and 436 are connected to contact 3 of relay 395 by conductor 483.

The collector elements 439 of the transistors 427–436 are connected to the readout device 309. As shown, they are connected to the ten solenoids 486 of a suitable solenoid input machine which provides a visual readout such as the Friden serial entry adding machine. The other sides of the solenoids 486 are connected to the negative terminal of the battery 442 by a conductor 491.

Operation of the multiple channel reading or sensing apparatus may now be briefly described as follows: As pointed out previously, each of the five channel codes recorded on the tape 207 represents a number or letter. The four five channel codes making up each recording have been recorded in-line on the tape 207 in a suitable relation such as an ordinal relation. It is, however, apparent that if desired, each of the five channel codes making up each of the recordations could have been recorded sequentially, one after the other longitudinally of the tape rather than transversely as shown.

When the readout device is a serial entry machine, means must be provided for feeding information from the tape 207 to the readout machine 309 in a serial manner. The distributor 302 serves this purpose. To perform a reading operation, let it be assumed that the distributor 302 has now been placed in operation. The first thing that will occur, as hereinbefore explained, is that contacts 1 to 10 of the first bank or series of contacts 316 will be closed simultaneously. At the same time these contacts are closed, the contacts 323, 324, 326, 327 and 328 are closed. Closing of these last contacts energizes the pulse generators 371–375 to cause the generation of pulses in a manner hereinbefore described. The pulses are applied to the conductors 351–355 across the attenuator circuits 356–360 and to the ion switches 331–335. Now let it be assumed that the electrodes 311 connected to the movable contacts 8 and 10 are overlying perforations in the paper tape 207. If such is the case, a spark will be generated in both of these perforations and the ion switches 334 and 335 will become ionized and cause the operation of the amplifiers 384 and 385. The amplifiers operate in a manner identical to that hereinbefore described and cause the operation of their associated relays 106 and closing of relay contacts 1 and 2. Closing of the contacts 1 and 2 causes energization of the relays 394 and 395 from the power supply 386.

Energization of the relays 394 and 395 causes operation of their associated contacts 1, 2 and 3 which are connected into the rows 405 and 406 of the transistor matrix 308. Operation of each of the relays will cause opening of the contacts 1 and 2 and closing of the contacts 2 and 3 of each of the relays.

Now starting from the apex of the matrix 308, that is starting with row 401, it will be noted that when relays 394 and 395 are energized and relays 391, 392 and 393 are not energized, current will flow in transistor 407 of row 401. This is because the negative terminal of the power supply 441 is connected to the base element 437 of the transistor 407 by the closed contacts 1 and 2 of relay 391.

Current will also flow in the transistor 411 because the base elements 34–37 of this transistor is connected to the battery 441 by normally closed contacts 1 and 2 of relay 392. Therefore, the signal from transistor 407 will flow through and be amplified by the transistor 411 in a manner well known to those skilled in the art.

In row 403, current flow will occur in transistor 418 because the base element 437 of this transistor is also connected to the negative terminal of the power supply 441 by the contacts 1 and 2 of the relay 393. In the same way current will flow through the transistor 425 because the base element 437 of this transistor is connected to the power supply 441 by the closed contacts 2 and 3 of the operated relay 394. Current will also flow in the transistor 435 because the base element of this transistor is connected to the power supply 441 by the closed contacts 2 and 3 of operated relay 395.

Thus, a current will flow through the matrix as hereinbefore described and through the solenoid 486 which bears the number 9. In summary, current will flow from the battery 442 through conductor 443 to the apex of the matrix, through the matrix, through the number 9 solenoid and through the common return 491 to the negative terminal of the battery 442. The energization of the number 9 solenoid causes actuation of the corresponding decimal unit in a suitable readout device 309 such as the Friden solenoid input machine hereinbefore described.

As soon as the reading has been completed on the first five channel code, the distributor 302 is advanced to close the second series or bank of contacts 317 after which an operation similar to that hereinbefore described takes place. Each time one of the solenoids 486 corresponding to the five channel code being read is energized, it causes the correspondnig decimal unit to be set up in the readout device. The same sequence of operation occurs when the banks of contacts 318 and 319 are closed.

It should be pointed out that after each solenoid 486 is energized, the switches 323, 324, 326, 327 and 328 are opened. This is done for two reasons, one to conserve the power of the power supplies 28 and the second to eliminate breaking of high voltages by the contacts in the distributor 302.

After all four of the five channel codes have been read by the distributor and the corresponding decimal units set up in the readout device, the contacts 321 are operated to operate the readout mechanism of the readout machine to print or punch the information onto a paper tape which is fed through the machine. Contacts 322 are then closed which causes the tape in the readout machine to be advanced. This completes one reading operation. The tape 207 may then be advanced after which another reading operation can take place. Thus, it is apparent that information contained on the tape 207 can be recorded on the paper tape produced by the readout device 309.

It is apparent from the foregoing that I have provided a system, apparatus and method for recording and sensing at very high speeds. The system and apparatus for recording and sensing is of a type which can be manufactured in economical and relatively compact units. Large quantities of information can be recorded on very small quantities of paper tape. The apparatus is constructed with the use of solid state components which, therefore, eliminates any warm up and permits high speed operations. Information can be read and recorded in single channels or can be recorded and read in multiple channels. It is also apparent that the system and apparatus and method is particularly adaptable for use with multiple channel codes in which the multiple channel codes can be utilized for recording and reading ordinal relations as for example, decimal relations.

I claim:

1. In a system for recording information in bit form on a sheet material containing cellulose, a pulse generator for generating for each information bit a pulse of a predetermined time interval and having a voltage greater than the dielectric strength of the material, and means including an electrode connected to said pulse generator for applying the pulses generated by said pulse generator to said material to cause the pulses to establish paths through the material by overcoming the dielectric strength of the material and thereby carbonizing certain portions of the material, and incinerating the carbonized material to thereby establish a hole in the material, said pulse generator including means for limiting the current flow during the application of said pulses so that said holes have a substantially uniform size.

2. In a system for recording information in bit form on a sheet of material containing cellulose, a pair of electrodes arranged so that the material is disposed between the pair of electrodes, a transformer having primary and secondary windings, means connecting the secondary winding of the transformer to the electrodes, and means for applying for each information bit a single pulse having a steep wave front to the primary winding of the transformer so that a pulse is formed in the secondary winding of the transformer which has a voltage amplitude which exceeds the dielectric strength of the material to create an ionized path in which an arc flows, and means for limiting the current flow in each of said pulses during the application of said pulses, each pulse having a predetermined time duration so that current flows in the ionized path for a predetermined period of time to create a hole of a predetermined size in the material, the pulse having a voltage amplitude which at the termination of the predetermined interval of time drops to extinguish the arc.

3. A system as in claim 2 wherein the means for applying a pulse to the primary winding of the transformer consists of an electronic pulse forming circuit connected to the primary winding of the transformer, and means for triggering said electronic pulse forming circuit.

4. In a system for recording information in bit form on a sheet material containing cellulose, a pulse generator for generating for each information bit a pulse of predetermined time interval and having a voltage greater than the dielectric strength of the material, said pulse generator comprising a transistor having a base, collector and emitter elements, a transformer having primary, secondary and feedback windings, means including a power supply connecting the primary winding of the transformer across the collector and emitter elements of the transistor, means including a capacitor in series with the feedback winding connecting the feedback winding between the base and the emitter elements of the transistor, means including at least one electrode connected to the secondary winding for taking off a high voltage from the secondary winding and applying the same to the sheet material to cause the pulses to establish paths through the material by overcoming the dielectric strength of the material and thereby carbonizing certain portions of the material and incinerating the carbonized material to thereby establish holes in the material, said pulse generator including means for limiting the current flow during the application of said pulses so that said holes have a substantially uniform size.

5. A system as in claim 4 together with means connected in the primary and feedback windings for bypassing substantially all of the back E.M.F. and radio frequency energy induced in the primary and feedback windings.

6. A system as in claim 4 wherein the means for taking off a high voltage from the secondary winding includes a plurality of serially connected cold cathode gas filled devices and means for connecting any number of the serially connected devices across the output of said secondary winding to thereby adjust the maximum voltage which is taken off.

7. In a system for recording information in bit form in multiple channels on a sheet material containing cellulose, a pulse generator for generating for each information bit a pulse of predetermined time duration which has a voltage greater than the dielectric strength of the material, a plurality of binary contacts connected to said pulse generator and means for positioning said binary contacts in a predetermined manner, contact means for sensing the binary contacts, a plurality of electrodes adapted to be engaged by such contact means, and timing means for causing the application of a plurality of pulses from said pulse generator as the contact means is progressed over said binary contacts and said electrodes to place perforations in said material in accordance with the positioning of said binary contacts.

8. In a system for recording information in bit form on a sheet of material containing cellulose, a pair of electrodes arranged so that the material is disposed between the pair of electrodes, a transformer having primary and secondary windings, means connecting the secondary winding of the transformer to the electrodes, means for applying for each information bit a single pulse having a steep wave front to the primary winding of the transformer so that a pulse is formed in the secondary winding of the transformer which has a voltage amplitude which exceeds the dielectric strength of the material to create an ionized path in which an arc flows, each pulse having a predetermined time and duration so that current flows in an ionized path for a predetermined period of time to create a hole of a predetermined size in the material, the pulse having a voltage amplitude which at the termination of the predetermined interval drops to extinguish the arc, said means for applying a pulse to the primary winding of the transformer consisting of an electronic pulse forming circuit connected to the primary winding of the transformer, and means for triggering said electronic pulse forming circuit, said transformer also having a feedback winding, said pulse forming circuit consisting of a transistor having base, collector and emitter elements, means including a power supply connecting the primary winding of the transformer across the collector and emitter elements of the transistor, means including a capacitor in series with the feedback winding for connecting the feedback winding between the base and emitter elements of the transistor, and means connected in the primary and feedback windings for bypassing substantially all of the back E.M.F. and radio frequency energy induced in the primary and feedback windings.

References Cited by the Examiner

UNITED STATES PATENTS

| | | | |
|---|---|---|---|
| 1,549,473 | 8/1925 | Finch | 178—17 |
| 1,805,195 | 5/1931 | Tanberg. | |
| 1,097,131 | 5/1941 | Kitsee. | |
| 2,560,247 | 7/1951 | Rich | 346—74 |
| 2,647,033 | 7/1953 | Faus | 346—74 |
| 2,678,373 | 5/1954 | Suran | 346—74 |
| 2,688,739 | 9/1954 | Hofgaard | 340—173 |
| 2,784,389 | 3/1957 | Kelly | 340—173 |
| 2,899,676 | 8/1959 | Rivers | 340—347 |
| 2,909,768 | 10/1959 | Kautz | 340—347 |
| 2,915,710 | 12/1959 | Schiewe | 331—112 |
| 2,924,786 | 2/1960 | Talkin | 331—112 |

FOREIGN PATENTS

| | | |
|---|---|---|
| 853,069 | 11/1960 | Canada. |

IRVING L. SRAGOW, *Primary Examiner.*

EVERETT R. REYNOLDS, JOHN F. BURNS, *Examiners.*